US00RE50098E

(19) United States
(12) Reissued Patent
Peters et al.

(10) Patent Number: US RE50,098 E
(45) Date of Reissued Patent: Aug. 27, 2024

(54) MOUNT FOR HANDHELD ELECTRONIC DEVICES

(71) Applicant: ANNEX PRODUCTS PTY. LTD., South Yarra (AU)

(72) Inventors: Christopher L. Peters, Glen Iris (AU); Craig Stevens, Northcote (AU)

(73) Assignee: ANNEX PRODUCTS PTY LTD, South Yarra (AU)

(21) Appl. No.: 17/523,154

(22) Filed: Nov. 10, 2021

Related U.S. Patent Documents

Reissue of:
(64) Patent No.: 10,569,717
Issued: Feb. 25, 2020
Appl. No.: 15/994,581
Filed: May 31, 2018

(51) Int. Cl.

| | |
|---|---|
| ***B60R 11/02*** | (2006.01) |
| ***B62J 11/00*** | (2020.01) |
| ***B62J 50/21*** | (2020.01) |
| ***F16B 2/06*** | (2006.01) |
| ***F16M 11/00*** | (2006.01) |
| ***F16M 11/04*** | (2006.01) |
| ***F16M 13/02*** | (2006.01) |
| *B60R 11/00* | (2006.01) |

(52) U.S. Cl.
CPC ..... *B60R 11/02* (2013.01); *B62J 50/225* (2020.02); *F16B 2/06* (2013.01); *F16M 11/041* (2013.01); *F16M 13/02* (2013.01); *B60R 2011/0071* (2013.01); *B60R 2011/0089* (2013.01)

(58) Field of Classification Search
CPC .... F16B 2/04; F16B 2/06; F16B 2/065; F16B 7/025; F16B 21/02; F16B 21/086; B60R 11/02; B60R 2011/0071; B60R 2011/0084; B60R 2011/0089; B62K 21/00; B62J 11/00; B62J 50/225
See application file for complete search history.

(56) References Cited

U.S. PATENT DOCUMENTS

| | | | | |
|---|---|---|---|---|
| 719,426 | A | 2/1903 | Boone | |
| 2,661,649 | A | 12/1953 | Skinner | |
| 3,312,138 | A | 4/1967 | Cumming | |
| 4,134,703 | A * | 1/1979 | Hinners | A63C 11/221 248/188.5 |
| 4,167,352 | A * | 9/1979 | Pletscher | B62K 21/18 403/104 |
| 4,274,301 | A | 6/1981 | Katayama | |
| 4,798,273 | A | 1/1989 | Ward, II | |

(Continued)

FOREIGN PATENT DOCUMENTS

| | | |
|---|---|---|
| CN | 1531633 | 9/2004 |
| CN | 100999244 | 7/2007 |

(Continued)

OTHER PUBLICATIONS

U.S. Appl. No. 15/994,581, filed May 31, 2018.

(Continued)

*Primary Examiner* — Patricia L Engle
(74) *Attorney, Agent, or Firm* — Barnes & Thornburg LLP

(57) ABSTRACT

A mount includes a mount base and a mount head coupled to the mount base. The mount base supports the mount head relative to another stationary or movable structure. A handheld electronic device couples to the mount head to be supported relative to the structure at the selection of a user.

12 Claims, 5 Drawing Sheets

(56) References Cited

U.S. PATENT DOCUMENTS

| | | | | |
|---|---|---|---|---|
| 5,109,411 | A | 4/1992 | O'Connell | |
| 5,197,349 | A | 3/1993 | Herman | |
| 5,323,600 | A | 6/1994 | Munshi | |
| 5,423,566 | A | 6/1995 | Warrington et al. | |
| 5,661,942 | A | 9/1997 | Palmer | |
| 5,680,798 | A * | 10/1997 | Luen | B62K 21/18 280/279 |
| 6,234,506 | B1 | 5/2001 | Li | |
| 6,244,131 | B1 | 6/2001 | Liao | |
| 6,378,815 | B1 | 4/2002 | Lee | |
| 6,561,400 | B2 | 5/2003 | Lee | |
| 7,229,230 | B2 | 6/2007 | Choy | |
| 7,461,826 | B2 | 12/2008 | Carnevali | |
| 7,523,904 | B2 | 4/2009 | Carnevali | |
| 7,565,848 | B2 | 7/2009 | Fujii | |
| 8,020,828 | B2 | 9/2011 | Carnevali | |
| 8,261,954 | B2 | 9/2012 | Lee | |
| 8,267,418 | B1 | 9/2012 | Chuang | B62J 50/225 280/288.4 |
| 8,627,990 | B2 | 1/2014 | Nakajima et al. | |
| 8,641,714 | B2 | 2/2014 | Steiner et al. | |
| 8,708,205 | B2 | 4/2014 | Wotton | |
| 9,243,739 | B2 | 1/2016 | Peters | |
| 9,758,206 | B2 | 9/2017 | Chen | |
| 9,851,625 | B1 * | 12/2017 | Fernandez | G03B 17/561 |
| 9,889,904 | B1 * | 2/2018 | Blake | B62K 21/18 |
| 10,569,717 | B2 * | 2/2020 | Peters | F16M 11/08 |
| 11,303,143 | B2 | 4/2022 | Taylor et al. | |
| 11,717,060 | B2 | 8/2023 | Perkins et al. | |
| 2003/0052460 | A1 * | 3/2003 | Choy | F16B 9/054 277/607 |
| 2008/0111038 | A1 * | 5/2008 | Carnevali | B60N 3/101 248/276.1 |
| 2011/0233250 | A1 | 9/2011 | Nakajima et al. | |
| 2012/0074278 | A1 | 3/2012 | Hamaguchi | |
| 2013/0318775 | A1 | 12/2013 | Peters | |
| 2014/0178146 | A1 * | 6/2014 | Ma | F16B 7/0413 411/80 |
| 2016/0332689 | A1 | 11/2016 | Chen | B62J 43/20 |
| 2023/0198301 | A1 | 6/2023 | Peters et al. | |

FOREIGN PATENT DOCUMENTS

| | | |
|---|---|---|
| CN | 102369119 | 3/2012 |
| CN | 203809437 U | 9/2014 |
| CN | 205001297 U | 9/2014 |
| CN | 204606010 U | 9/2015 |
| CN | 205001297 U | 1/2016 |
| CN | 105371076 | 3/2016 |
| CN | 106143716 | 11/2016 |
| CN | 107856782 | 3/2018 |
| CN | 109891144 | 6/2019 |
| CN | 113320629 | 8/2021 |
| DE | 102008038374 | 3/2010 |
| EP | 1808367 | 7/2007 |
| GB | 2200402 | 8/1988 |
| WO | WO 2014/107230 | 7/2014 |

OTHER PUBLICATIONS

Extended Search Regort issued in Appl. No. EP19812227.7 (Jan. 14, 2022).

Examination Report issued in EP 19812227 (Mar. 13, 2023).

Quad Lock—Mounts, Annex Products Pty Ltd., accessed on-line at: www.quadlockcase.com:80/collections/mounts (Jul. 26, 2015).

Search Report & Written Opinion issued in Int'l Appl. No. PCT/AU2019/050517 (May 24, 2019).

English translation of Office Action issued in Appl. No. CN 2019800296533 (Dec. 27, 2023).

F1.English translation of Office Action issued in CN 201980029653.3 (Jun. 7, 2024).

Examination Report issued in EP19812227.7 (Apr. 12, 2024).

Quad Lock—Mounts, Annex Products Pty Ltd., accessed on-line at: www.quadlockcase.com/collections/shop-mounts (available prior to filing of the present application).

Search Report & Written Opinion issued in Int'l Appl. No. PCT/AU2019/050517 (2019).

* cited by examiner

MOUNT FOR HANDHELD ELECTRONIC DEVICES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

The present disclosure relates to a mount, and particularly to a mount for handheld electronic devices. More particularly, the present disclosure relates to a mount for positioning a handheld electronic device relative to a vehicle such as a motorcycle.

SUMMARY

A mount in accordance with the present disclosure includes a mount base and a mount head coupled to the mount base. The mount base supports the mount head relative to another stationary or movable structure. A handheld electronic device couples to the mount head to be supported relative to the structure at the selection of a user.

In illustrative embodiments, an expanding clamp is coupled to the mount base to engage with a tubular component of the structure, such as a front fork center tube of a motorcycle. The expanding clamp includes a plurality of keys, a driver, and a fastener. The fastener passes at least partially through the base to engage with the driver. The keys are positioned around the fastener and held together with one or more retainers. The fastener moves the driver relative to a post coupled to the base to move the keys between a retracted position and an expanded position.

In illustrative embodiments, each key is formed to define one or more grooves and slots. The grooves position the retainers relative to the keys. The slots engage with flanges on the driver and the post to align the keys relative to the base and block rotation of the driver relative to the base. Beveled surfaces of the keys engage with beveled surfaces of the driver and the post to translate axial movement of the driver into radial movement of the keys.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
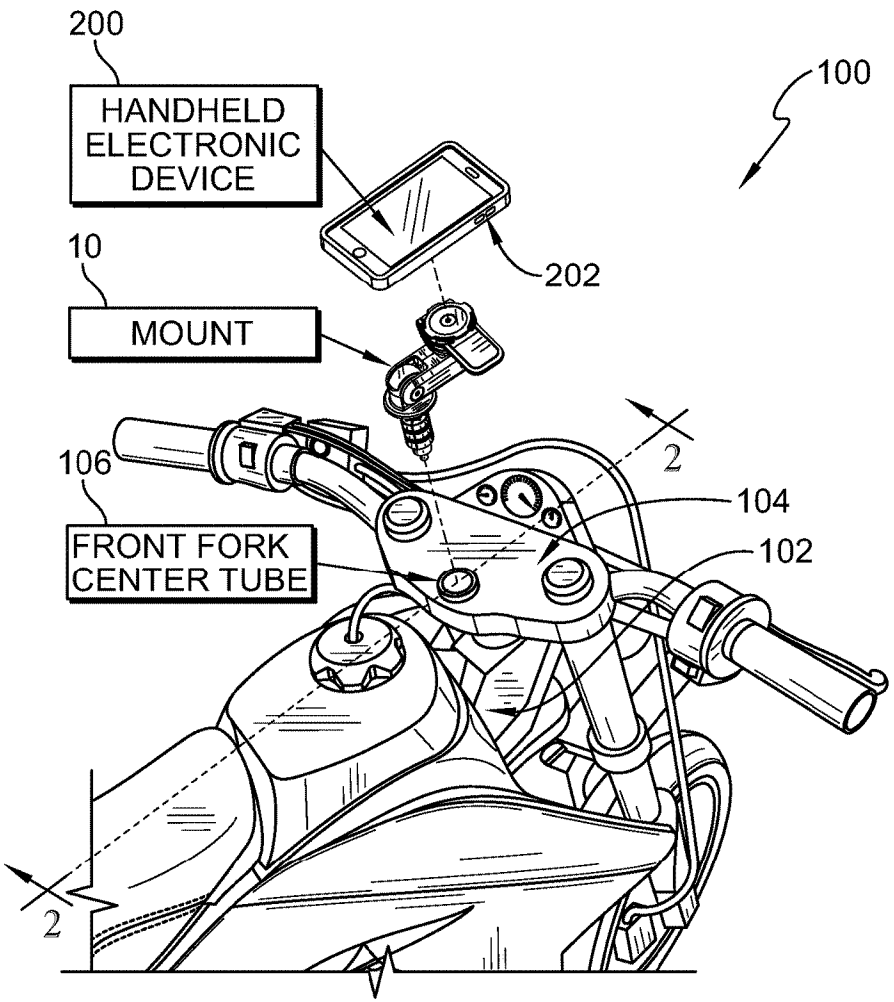
FIG. 1 is a partial perspective view of a motorcycle showing a mount in accordance with the present disclosure positioned for attachment with a front fork center tube of the motorcycle and suggesting that a handheld electronic device attaches with the mount to hold the handheld electronic device on the motorcycle.

A mount 10 in accordance with the present disclosure is shown in FIG. 1. Mount 10 is configured for attachment with a vehicle 100, such as a motorcycle, for positioning a handheld electronic device 200, such as a smartphone, tablet, GPS unit, or monitor for example, relative to motorcycle 100. In the illustrative embodiment, motorcycle 100 includes a frame 102 and a front fork assembly 104. Mount 10 engages with a front fork center tube 106 of front fork assembly 104 to hold mount 10 on motorcycle 100. A case 202 attached to handheld electronic device 200 engages with mount 10 to hold handheld electronic device 200 on motorcycle 100.

Figure 2:
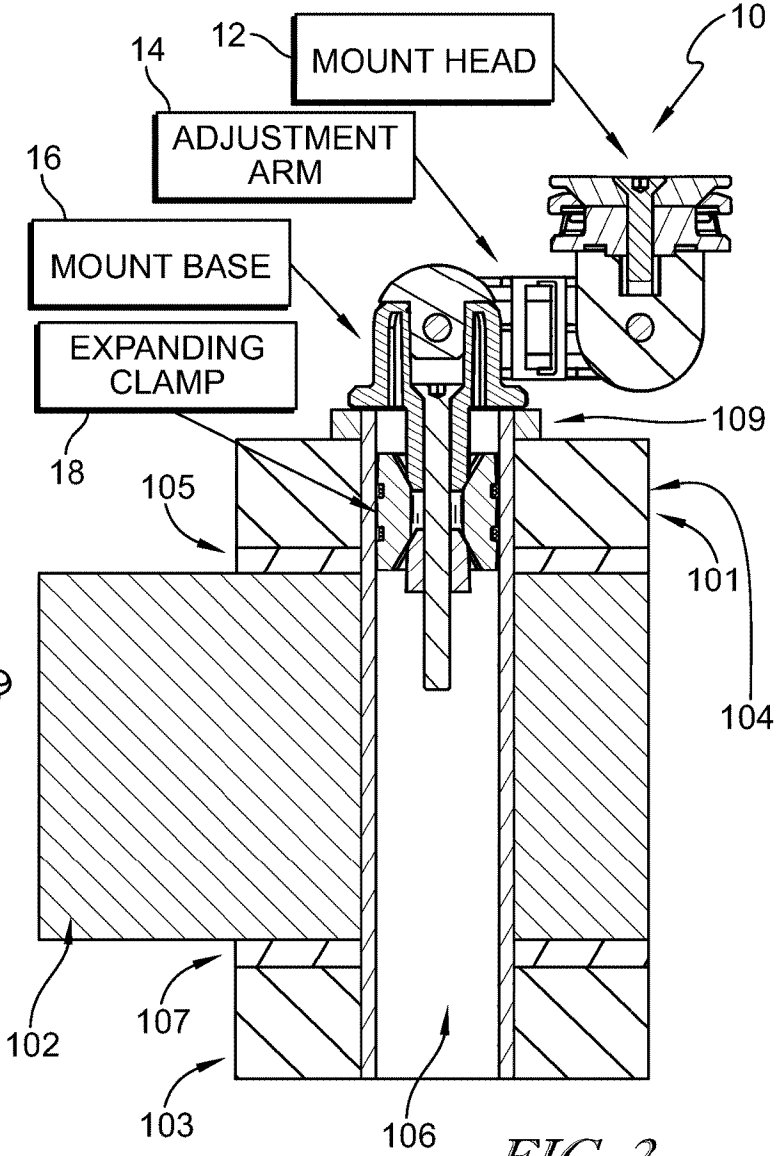
FIG. 2 is a sectional view taken along line 2-2 in FIG. 1 showing an expanding clamp of the mount received in the front fork center tube and suggesting that the expanding clamp engages with an inner surface of the front fork center tube to hold the mount on the motorcycle at the selection of a user.

Mount 10 includes a mount head 12, a mount base 16, and an expanding clamp 18 as shown in FIG. 2. An adjustment arm 14 is coupled at a first end to base 16 and at an opposite second end to head 12. Adjustment arm 14 allows movement of head 12 relative to base 16 at the selection of a user. Expanding clamp 18 is coupled to base 16 and is configured to engage with center tube 106 to hold mount 10 on motorcycle 100. Base 16 rests on an upper end of center tube 106 and expanding clamp 18 engages with an inner surface of center tube 106. In some embodiments, expanding clamp 18 can engage with other tubes (circular and non-circular) for holding mount 10 on other vehicles or stationary structures.

The components of mount 10 can be arranged in various configurations in accordance with other embodiments of the present disclosure. For example, in some embodiments, head 12 can be attached to base 16 without the use of adjustment arm 14. In some embodiments, head 12 can be attached to expanding base 18 without the use of adjustment arm 14 or base 16.

Front fork assembly 104 includes an upper fork plate 101 and a lower fork plate 103 coupled together by center tube 106. In the illustrative embodiment, center tube 106 is secured to lower fork plate 103, such as by welding or threading, and center tube 106 extends through frame 102 and upper fork plate 101 to engage with a nut 109 for securing front fork assembly 104 onto frame 102. Bearings 105, 107 are positioned relative to frame 102 and fork plates 101, 103, respectively, to allow smooth rotation of front fork assembly 104 relative to frame 102.

Figure 3:
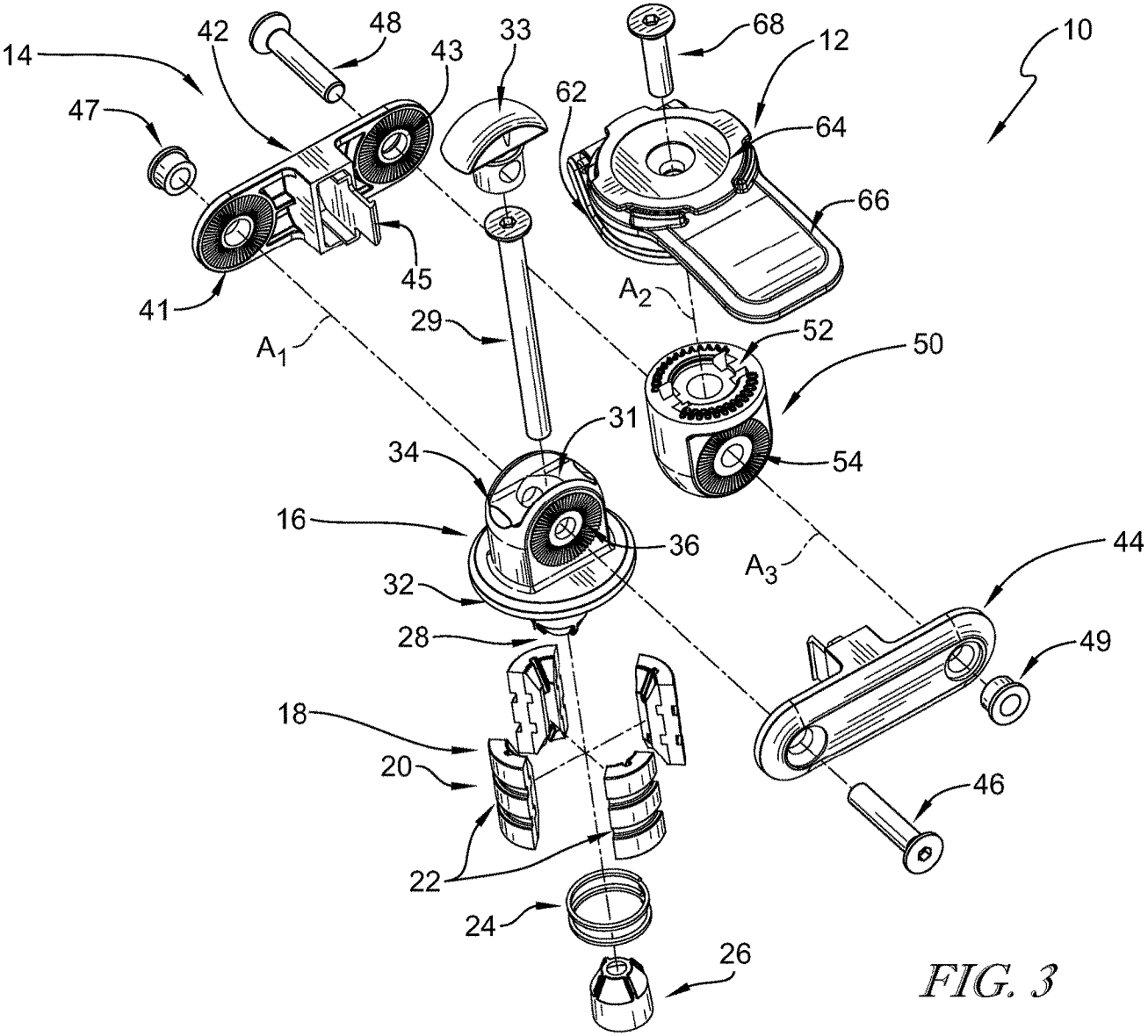
FIG. 3 is an exploded assembly view of the mount of FIG. 1.
Figure 4:
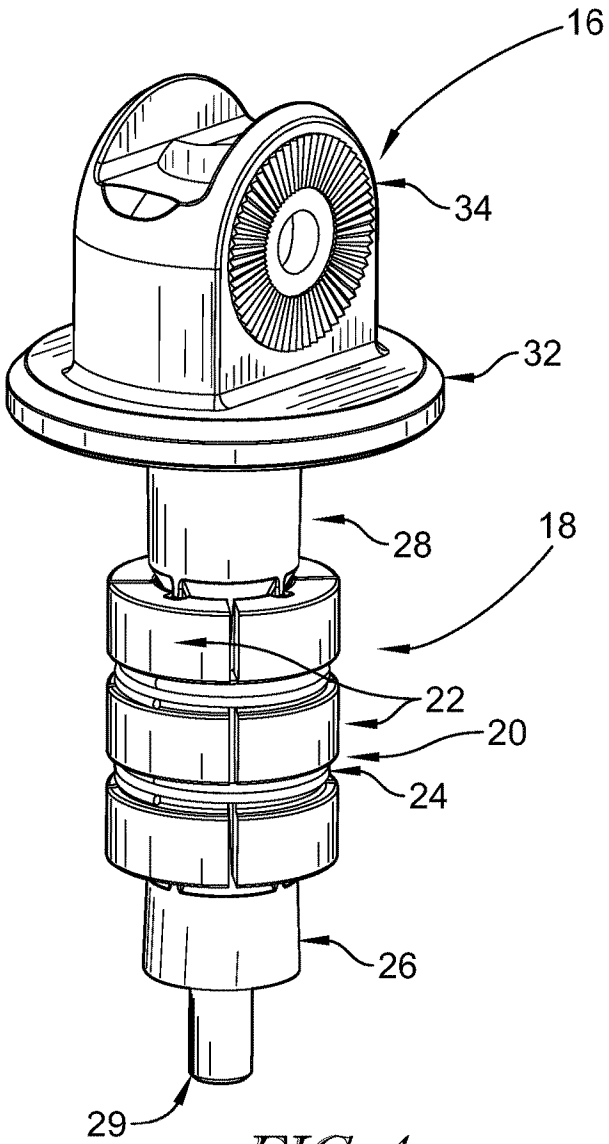
FIG. 4 perspective view of the expanding clamp of FIG. 2.

Expanding clamp 18 includes a cylinder 20, a driver 26, and a fastener 29 as shown in FIG. 3. Fastener 29 passes at least partially through base 16 to engage with driver 26. In the illustrative embodiment, cylinder 20 is defined by a plurality of keys 22 held together with one or more retainers 24 as shown in FIG. 4. Retainers 24 are formed as a coil of wire made of a resilient material, such as metal. In some embodiments, retainers 24 are formed as C-clips or other resiliently deformable shapes. Four keys 22 are illustratively used to form cylinder 20. In some embodiments, more or less keys 22 are used. In some embodiments, cylinder 20 is formed as a unitary structure, such as a sleeve of resiliently deformable material. Cylinder 20 may include any other suitable structure for securing the mount 10 to a motorcycle, bicycle or any other surface in accordance with other embodiments of the present disclosure.

Figure 5:
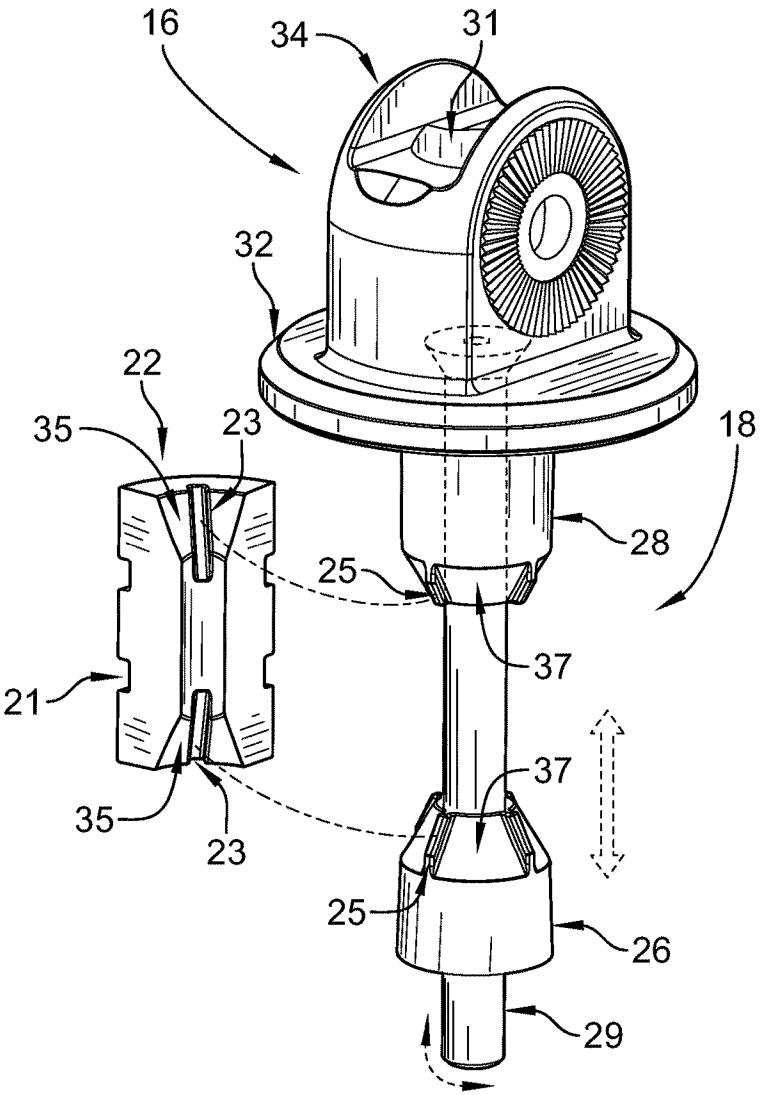
FIG. 5 is a partial exploded assembly view of the expanding clamp of FIG. 4 showing that slots in a key engage with flanges of a driver and post to align the key with the driver and post and that the driver is movable relative to the post with rotation of a fastener.

Fastener 29 moves driver 26 relative to a post 28 coupled to base 16 as suggested in FIG. 5. Each key 22 of cylinder 20 is formed to define one or more grooves 21 along a radially outer surface and slots 23 in radially inner surfaces at opposing axial ends. Grooves 21 position retainers 24 relative to keys 22. Slots 23 engage with flanges 25 on driver 26 and post 28 to align keys 22 relative to base 16 and block rotation of driver 26 relative to base 16.

Figure 7:
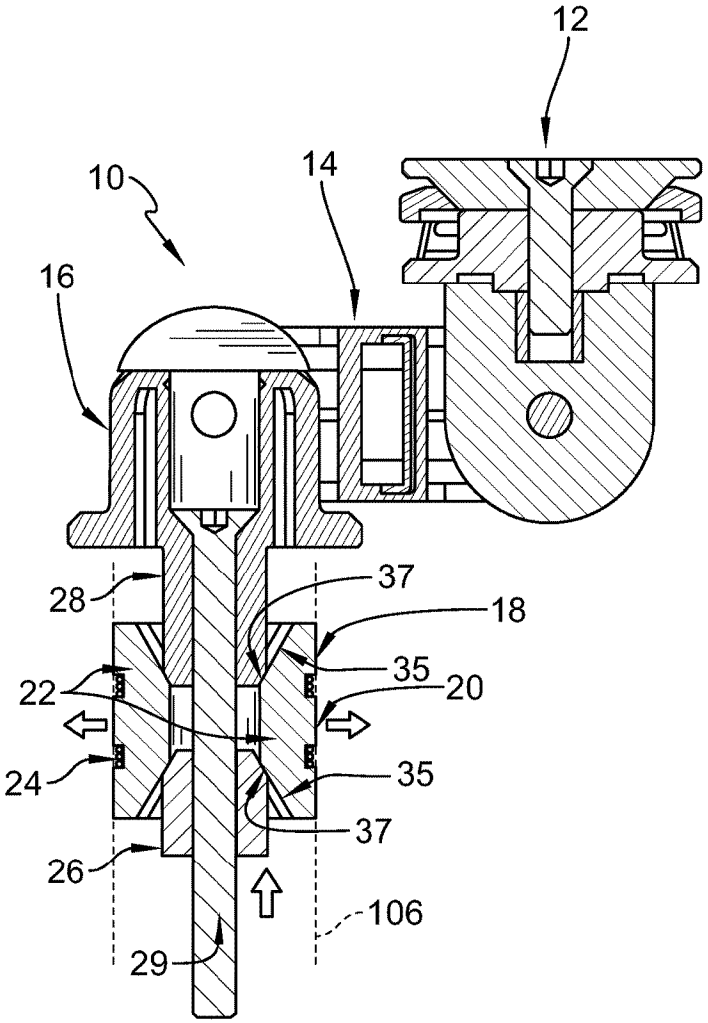
FIG. 7 is a similar view to FIG. 6 showing the expanding clamp in an expanded position engaged with the front fork center tube.
Figure 6:
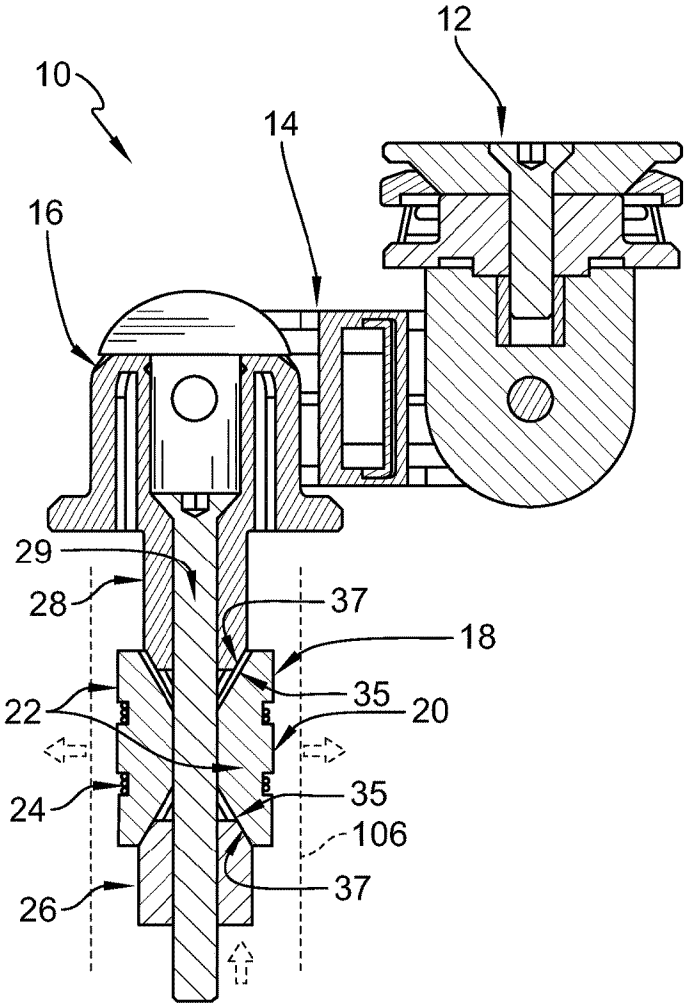
FIG. 6 is a similar view to FIG. 2 showing the expanding clamp in a retracted position and suggesting that movement of the driver relative to the post forces the keys outward to engage with the front fork center tube.

Beveled surfaces 35 defined at opposing axial ends of keys 22 engage with beveled surfaces 37 of driver 26 and post 28 to translate axial movement of driver 26 into radial movement of cylinder 20 to move cylinder 20 between a retracted position (shown in FIG. 6) and an expanded position (shown in FIG. 7). In some embodiments, driver 26 engages with cylinder 20 to expand at least a portion of cylinder 20 radially outward, such as one or more of keys 22. In some embodiments, keys 22 can move to the same or different radial distances from fastener 29 in the expanded position of cylinder 20.

The retracted position of cylinder 20 allows expanding clamp 18 to be inserted into center tube 106 at any relative angular position a user selects, and the user can then rotate fastener 29 to move expanding clamp 18 to the expanded position to engage keys 22 with center tube 106 to attach mount 10 to motorcycle 100. In the illustrative embodiment, cap 33 and fastener 46 are removed in order to access fastener 29 as suggested in FIGS. 6 and 7. Retainers 24 bias keys 22 toward the retracted position. In some embodiments, keys 22 can be exchanged with keys of larger or smaller radial size to match with tubes of different sizes. In some embodiments, cylinder 20 can be formed thicker or thinner to match with tubes of different sizes.

In some embodiments, slots 23 of keys 22 are formed in beveled surfaces 35. In some embodiments, flanges 25 of driver 26 and post 28 extend from beveled surfaces 37. In some embodiments, no post 28 is used and keys 22 ride along a lower surface of base 16 as driver 26 moves keys 22 between the retracted and expanded positions. In some embodiments, driver 26 does not include a beveled surface 37 and moves keys 22 axially relative post 28 to move keys 22 between the retracted and expanded positions. Keys 22 and retainers 24 may include any other suitable structure for securing the mount 10 to a motorcycle, bicycle or any other surface in accordance with other embodiments of the present disclosure.

Base 16 of mount 10 includes a foot 32 and a tower 34 extending upward from foot 32 as shown in FIG. 3. Post 28 extends downward from foot 32. Base grips 36 are formed on opposing lateral sides of tower 34 and each base grip 36 includes a plurality of circumferentially spaced teeth. Fastener 29 extends into a bore 31 of base 16 and is covered by a cap 33.

Adjustment arm 14 includes a left arm-member 42 and a right arm-member 44 as shown in FIG. 3. Each arm-member 42, 44 includes a rear grip 41, a front grip 43, and a clip 45. Clips 45 of arm-members 42, 44 engage with one another to hold arm-members 42, 44 together. Rear grips 41 each include a plurality of circumferentially spaced teeth that engage with the teeth of base grips 36 of base 16 to allow selective positioning of arm-members 42, 44 relative to base 16 about an axis $A_1$. A fastener 46 extends through arm-member 42, 44, tower 34, and cap 33 to engage with a nut 47. Tightening of fastener 46 with nut 47 fixes a position of arm-members 42, 44 relative to base 16 at the selection of a user.

A knuckle 50 is formed to define a head grip 52 and arm grips 54 positioned on opposing lateral sides of knuckle 50 as shown in FIG. 3. Head 12 is coupled to knuckle 50 with a fastener 68 and engages with head grip 52 to allow selective positioning of head 12 relative to knuckle 50 about an axis $A_2$. Each arm grip 54 includes a plurality of circumferentially spaced teeth. Front grips 43 of arm-members 42, 44 each include a plurality of circumferentially spaced teeth that engage with the teeth of arm grips 54 to allow selective positioning of knuckle 50 (and head 12) relative to arm-members 42, 44 about an axis $A_3$. A fastener 48 extends through arm-member 42, 44 and knuckle 50 to engage with a nut 49. Tightening of fastener 48 with nut 49 fixes a position of knuckle 50 relative to arm-members 42, 44 at the selection of a user.

Head 12 of mount 10 includes a support plate 62 and an attachment plate 64 coupled to support plate 62 as shown in FIG. 3. Support plate 62 engages with head grip 52 of knuckle 50 to allow selective positioning of head 12 relative to knuckle 50. A paddle 66 is coupled to support plate 62 and movable relative to attachment plate 64.

Figure 8:
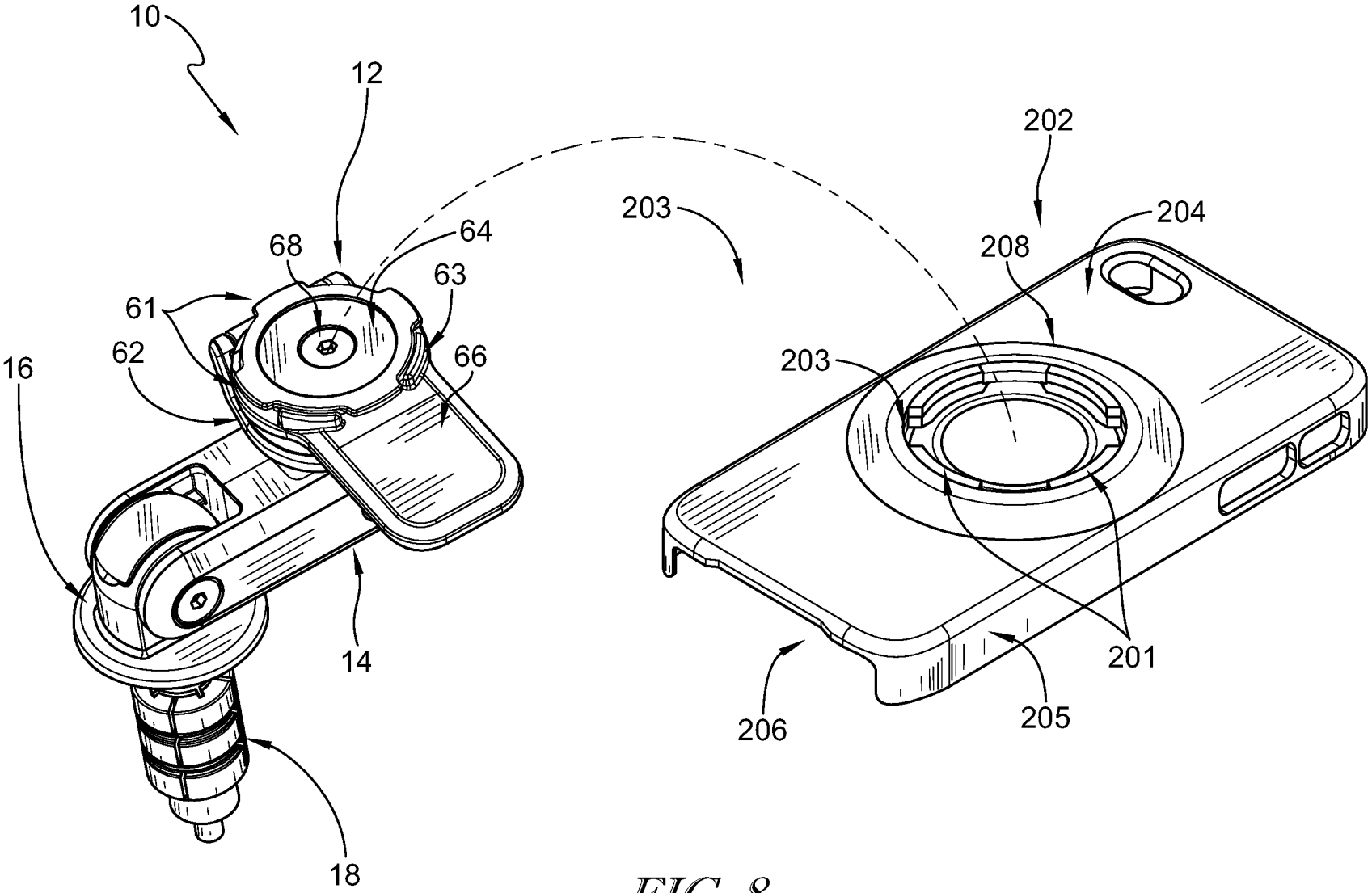
FIG. 8 is a perspective view of the mount of FIG. 1 showing the case of the handheld electronic device positioned for attachment with the mount and suggesting that a head of the mount engages with a receiver of the case for attaching the case and handheld electronic device to the mount.

Case 202 includes a rear wall 204 and a perimeter wall 205 defining an interior space 206 for attachment with handheld electronic device 200 as shown in FIG. 8. A receiver 208 is formed in rear wall 204 and includes a series of case tabs 201 separated by gaps 203. A series of mount tabs 61 extend outward from attachment plate 64 for engagement with case tabs 201 to attach case 202 (including handheld electronic device 200 stored therein) with mount 10. Mount tabs 61 pass through gaps 203 and case 202 is rotated relative to mount 10 to engage mount tabs 61 with case tabs 201. Lock tabs 63 on paddle 66 fall into gaps 203 and engage with case tabs 201 to block removal of case 202 from mount 10 at the selection of a user. The user moves paddle 66 relative to attachment plate 64 to pull lock tabs 63 out of gaps 203 and allow rotation and removal of case 202 from mount 10.

In illustrative embodiments, the components of mount 10 can be formed from various rigid materials, such as thermoplastic polymers, metals, and metal alloys, among others. In some embodiments, cylinder 20 can be formed from various resilient, deformable materials, such as thermoset polymers and natural rubbers, among others.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

[1. A mount comprising:

a head adapted to engage with a case of a handheld electronic device;

a base coupled to the head; and an expanding clamp coupled to the base, the expanding clamp including a cylinder, a driver, and a fastener, the driver and fastener aligned with the base along a common axis;

wherein the fastener passes at least partially through the base to engage with the driver, the cylinder is positioned around the fastener, and the fastener is configured to move the driver axially relative to the base to move at least a portion of the cylinder radially between a retracted position and an expanded position at the selection of a user;

wherein the cylinder is defined by a plurality of keys, wherein the keys are positioned around the fastener, and wherein the fastener is configured to move the driver axially relative to the base to move at least one of the keys radially between a retracted position and an expanded position at the selection of a user; and wherein the keys are held together by one or more retainers.]

[2. The mount of claim 1, wherein the one or more retainers bias the keys toward the retracted position.]

[3. The mount of claim 1, wherein each key is formed to define one or more grooves for positioning the one or more retainers relative to the keys. ]

[4. The mount of claim 1, wherein each key is formed to define a beveled surface at an axial end of the key, and wherein the beveled surfaces of the keys engage with a beveled surface of the driver to translate axial movement of the driver into radial movement of the keys.]

5. A mount comprising:

a head [adapted to] *configured to extend into and* engage with *a receiver of* a case of a handheld electronic device *for removably mounting the handheld electronic device to the mount*;

a base coupled to the head; and an expanding clamp coupled to the base, the expanding clamp including a [cylinder] *plurality of keys*, a driver, and a fastener, the driver and fastener aligned with the base along a common axis;

wherein the fastener passes at least partially through the base to engage with the driver, the [cylinder is] *plurality of keys are* positioned around the fastener, and the fastener is configured to move the driver axially relative to the base to move at least [a portion of the cylinder] *one key of the plurality of keys* radially between a retracted position and an expanded position at the selection of a user;

*further comprising a post coupled to the base,* wherein each key *of the plurality of keys* is formed to define [a] beveled [surface] *surfaces* at [an] *opposing* axial [end] *ends* of the key, and wherein the beveled surfaces of the keys engage with a beveled surface of the driver *and a beveled surface of the post* to translate axial movement of the driver into radial movement of the keys;

wherein each key *of the plurality of keys* is further formed to define slots in radially inner surfaces at *the* opposing axial ends of the key, and wherein the slots of the keys engage with flanges of the driver and the [base] *post* to align the keys relative to the base and block rotation of the driver relative to the base*; and*

*wherein the plurality of keys are held together by one or more retainers.*

[6. A mount comprising:

a head adapted to engage with a case of a handheld electronic device;

a base coupled to the head; and an expanding clamp coupled to the base, the expanding clamp including a cylinder, a driver, and a fastener, the driver and fastener aligned with the base along a common axis;

wherein the fastener passes at least partially through the base to engage with the driver, the cylinder is positioned around the fastener, and the fastener is configured to move the driver axially relative to the base to move at least a portion of the cylinder radially between a retracted position and an expanded position at the selection of a user;

wherein the cylinder is defined by a plurality of keys, wherein the keys are positioned around the fastener, and wherein the fastener is configured to move the driver axially relative to the base to move at least one of the keys radially between a retracted position and an expanded position at the selection of a user; and further comprising a post coupled to the base, wherein each key is formed to define a beveled surface at an axial end of the key, and wherein the beveled surfaces of the keys engage with a beveled surface of the post to translate axial movement of the driver into radial movement of the keys.]

[7. The mount of claim 6, wherein each key is further formed to define slots in radially inner surfaces at opposing axial ends of the key, and wherein the slots of the keys engage with flanges of the driver and the post to align the keys relative to the base and block rotation of the driver relative to the base.]

[8. The mount of claim 1, wherein the plurality of keys includes four keys.]

[9. The mount of claim 1, wherein the one or more retainers includes two retainers. ]

[10. A mount comprising:

a head adapted to engage with a case of a handheld electronic device;

a base coupled to the head;

an expanding clamp coupled to the base, the expanding clamp including a cylinder, a driver, and a fastener, the driver and fastener aligned with the base along a common axis;

wherein the fastener passes at least partially through the base to engage with the driver, the cylinder is positioned around the fastener, and the fastener is configured to move the driver axially relative to the base to move at least a portion of the cylinder radially between a retracted position and an expanded position at the selection of a user;

wherein the cylinder is defined by a plurality of keys, wherein the keys are positioned around the fastener, and wherein the fastener is configured to move the driver axially relative to the base to move at least one of the keys radially between a retracted position and an expanded position at the selection of a user; and further comprising an attachment arm coupled at a first end to the base and at an opposite second end to the head, wherein the adjustment arm is configured to position the head relative to the base.]

[11. An expanding clamp for use with a mount of a handheld electronic device, the expanding clamp comprising:

a cylinder;

a driver; and a fastener extending at least partially through the mount to engage with the driver, the fastener and the driver aligned along a common axis, wherein the cylinder is positioned around the fastener, and the fastener is configured to move the driver axially relative to the mount to move at least a portion of the cylinder radially between a retracted position and an expanded position at the selection of a user;

wherein the cylinder is defined by a plurality of keys, wherein the keys are positioned around the fastener, and wherein the fastener is configured to move the driver axially relative to the mount to move at least one of the keys radially between a retracted position and an expanded position at the selection of a user; and wherein the keys are held together by one or more retainers.]

[12. The expanding clamp of claim 11, wherein the one or more retainers bias the keys toward the retracted position.]

[13. The expanding clamp of claim 11, wherein each key is formed to define one or more grooves for positioning the one or more retainers relative to the keys.]

[14. The expanding clamp of claim 11, wherein each key is formed to define a beveled surface at an axial end of the key, and wherein the beveled surfaces of the keys engage with a beveled surface of the driver to translate axial movement of the driver into radial movement of the keys.]

[15. The expanding clamp of claim 14, wherein each key is further formed to define a slot in a radially inner surface at the axial end of the key, and wherein the slots of the keys engage with flanges of the driver to block rotation of the driver relative to the keys. ]

[16. The expanding clamp of claim 11, wherein the plurality of keys includes four keys.]

[17. The expanding clamp of claim 16, wherein the one or more retainers includes two retainers.]

*18. The mount of claim 5, wherein the one or more retainers bias the keys toward the retracted position.*

*19. The mount of claim 5, wherein each key of the plurality of keys is formed to define one or more grooves for positioning the one or more retainers relative to the keys.*

*20. The mount of claim 19, wherein the one or more retainers includes two retainers and wherein the one or more grooves includes two grooves.*

*21. The mount of claim 5, wherein the plurality of keys includes four keys.*

*22. The mount of claim 5, further comprising an adjustment arm coupled at a first end to the base and at an opposite second end to the head, wherein the adjustment arm is configured to position the head relative to the base.*

*23. A mount comprising:*

*a head configured to engage with a case of a handheld electronic device for removably mounting the handheld electronic device to the mount;*

*a base coupled to the head;*

*a post coupled to the base and rotationally fixed relative to the base; and*

*an expanding clamp coupled to the base, the expanding clamp including keys, a driver, and a fastener, the driver and fastener aligned with the post along a common axis;*

*wherein the fastener passes at least partially through the base and the post to engage with the driver, the keys are positioned around the fastener, and the fastener is configured to move the driver axially relative to the base to move at least one of the keys radially between a retracted position and an expanded position at the selection of a user,*

*wherein each key has a post-contacting portion at a first axial end and the post has a complementary key-contacting portion for each key;*

*wherein each key has a driver-contacting portion at a second axial end and the driver has a complementary key-contacting portion for each key;*

*wherein the post-contacting portion is configured to engage the complementary key-contacting portion of the post and the driver-contacting portion is configured to engage the complementary key-contacting portion of the driver to translate axial movement of the driver relative to the post into radial movement of the keys and to block rotation of the driver relative to the base, and*

*wherein the keys are held together by one or more retainers configured to bias the keys toward the retracted position.*

*24. The mount of claim 23, wherein:*

*the post-contacting portion of each key includes a beveled surface and a slot, and each key-contacting portion of the post has a beveled surface and a flange configured to engage the slot; and*

*the driver-contacting portion of each key includes a beveled surface and a slot, and each key-contacting portion of the driver has a beveled surface and a flange configured to engage the slot.*

*25. The mount of claim 23, wherein each key is formed to define one or more grooves for positioning the one or more retainers relative to the keys.*

*26. The mount of claim 25, wherein the one or more retainers includes two retainers and wherein the one or more grooves includes two grooves.*

*27. The mount of claim 23, wherein the keys include up to four keys circumferentially distributed around the fastener.*

*28. The mount of claim 23, further comprising an adjustment arm coupled at a first end to the base and at an opposite second end to the head, wherein the adjustment arm is configured to position the head relative to the base.*

* * * * *